(12) United States Patent
Yozell-Epstein et al.

(10) Patent No.: US 8,122,364 B2
(45) Date of Patent: Feb. 21, 2012

(54) METHOD AND COMPUTER-READABLE MEDIUM FOR NAVIGATING BETWEEN ATTACHMENTS TO ELECTRONIC MAIL MESSAGES

(75) Inventors: Rebekah Yozell-Epstein, Seattle, WA (US); Aaron Hartwell, Duvall, WA (US); Hernan Savastano, Seattle, WA (US); Erich S. Finkelstein, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 12/639,406

(22) Filed: Dec. 16, 2009

(65) Prior Publication Data

US 2010/0095224 A1    Apr. 15, 2010

Related U.S. Application Data

(63) Continuation of application No. 10/993,950, filed on Nov. 19, 2004, now Pat. No. 7,647,559, which is a continuation-in-part of application No. 10/955,361, filed on Sep. 30, 2004, now Pat. No. 7,243,298.

(51) Int. Cl.
    *G06F 3/00*    (2006.01)
(52) U.S. Cl. .................................. 715/752; 715/781
(58) Field of Classification Search .............. 715/752, 715/781
    See application file for complete search history.

(56) References Cited

U.S. PATENT DOCUMENTS

| | | | |
|---|---|---|---|
| 5,307,086 A | 4/1994 | Griffen et al. | |
| 5,579,466 A | 11/1996 | Habib et al. | |
| 5,640,580 A | 6/1997 | Slayden et al. | |
| 5,652,901 A | 7/1997 | Slayden et al. | |
| 5,680,629 A | 10/1997 | Slayden et al. | |
| 5,694,610 A | 12/1997 | Habib et al. | |
| 5,818,447 A | 10/1998 | Wolf et al. | |
| 5,835,084 A | 11/1998 | Bailey et al. | |
| 5,838,320 A | 11/1998 | Matthews, III et al. | |
| 5,845,293 A | 12/1998 | Veghte et al. | |
| 5,903,905 A | 5/1999 | Andersen et al. | |
| 6,008,806 A | 12/1999 | Nakajima et al. | |
| 6,034,687 A | 3/2000 | Taylor et al. | |
| 6,098,090 A | 8/2000 | Burns | |

(Continued)

FOREIGN PATENT DOCUMENTS

DE    19800423    7/1998

(Continued)

OTHER PUBLICATIONS

Olsen, J.W., "Best Outlook Add-Ins and Helpers", Sep. 14, 2004 www.windowsdevcenter.com/pub/a/windows/2004/09/14/Outlook_Addins.html.

(Continued)

*Primary Examiner* — Omar Abdul-Ali

(57) ABSTRACT

A method and computer-readable medium are provided for navigation between attachments to electronic mail messages. According to the method, a list of e-mail messages is displayed that includes header information associated with each of the messages. When one of the messages in the list is selected, a determination is made as to whether the selected message has attachments. If the selected message has attachments, an identifier is displayed adjacent to the header information for each attachment. The identifier indicates that the attachment is associated with the selected message and may provide other information such as the type and size of the attachment. The identifiers are displayed in a manner to indicate clearly to a user that the attachments are associated with the selected e-mail message. The identifiers may be selected to preview the corresponding attachment.

20 Claims, 8 Drawing Sheets

U.S. PATENT DOCUMENTS

| | | | |
|---|---|---|---|
| 6,134,566 | A | 10/2000 | Berman et al. |
| 6,160,554 | A | 12/2000 | Krause |
| 6,405,225 | B1 | 6/2002 | Apfel et al. |
| 6,616,702 | B1 | 9/2003 | Tonkin |
| 6,734,883 | B1 | 5/2004 | Wynn et al. |
| 6,839,411 | B1 | 1/2005 | Saltanov et al. |
| 6,944,819 | B2 | 9/2005 | Banatwala et al. |
| 7,017,073 | B2 | 3/2006 | Nair et al. |
| 7,243,298 | B2 | 3/2006 | Yozell-Epstein et al. |
| 7,113,934 | B2 | 9/2006 | Levesque et al. |
| 7,353,232 | B1* | 4/2008 | Kalucha et al. ............ 705/64 |
| 7,647,559 | B2 | 1/2010 | Yozell-Epstein et al. |
| 2003/0076322 | A1 | 4/2003 | Ouzts et al. |
| 2003/0101383 | A1 | 5/2003 | Carlson |
| 2004/0054737 | A1 | 3/2004 | Daniell |
| 2004/0068545 | A1* | 4/2004 | Daniell et al. ............. 709/206 |
| 2004/0158607 | A1 | 8/2004 | Coppinger et al. |
| 2004/0189695 | A1 | 9/2004 | Kurtz et al. |
| 2004/0193599 | A1 | 9/2004 | Liu et al. |
| 2004/0205625 | A1 | 10/2004 | Banatwala et al. |
| 2004/0205633 | A1 | 10/2004 | Martinez et al. |
| 2004/0260756 | A1* | 12/2004 | Forstall et al. ............. 709/200 |
| 2005/0010860 | A1 | 1/2005 | Weiss et al. |
| 2005/0117032 | A1 | 6/2005 | Ueda et al. |
| 2005/0192974 | A1 | 9/2005 | DeLorme et al. |
| 2005/0235203 | A1 | 10/2005 | Undasan |
| 2005/0246643 | A1 | 11/2005 | Gusmorino et al. |
| 2006/0031336 | A1 | 2/2006 | Friedman et al. |
| 2006/0031775 | A1 | 2/2006 | Sattler et al. |
| 2006/0036558 | A1 | 2/2006 | Moore et al. |
| 2006/0075046 | A1 | 4/2006 | Yozell-Epstein et al. |
| 2006/0224937 | A1 | 10/2006 | Sudoh et al. |
| 2007/0297029 | A1 | 12/2007 | Low et al. |

FOREIGN PATENT DOCUMENTS

| | | |
|---|---|---|
| EP | 1182600 | 2/2002 |
| GB | 2347581 | 9/2000 |
| JP | 10-247156 | 9/1998 |
| JP | 10-320390 | 12/1998 |
| JP | 2002-278899 | 9/2002 |
| JP | 2003330355 | 11/2003 |
| JP | 2004199700 | 7/2004 |
| KR | 10-2001-0048628 | 6/2001 |
| KR | 10-2002-0096509 | 12/2002 |
| ZA | 200306968 | 6/2004 |

OTHER PUBLICATIONS

PR Newswire, "X1 Brings Instantaneous Search to Email, Attachments and PC Files", Feb. 18, 2004.

European Communication dated Mar. 28, 2006, European Search Report for Application No. EP05107772.5.

European Communication dated Mar. 29, 2006, European Search Report for Application No. EP05105464.1.

U.S. Office Action dated Nov. 16, 2006 cited in U.S. Appl. No. 10/955,361.

Barber, Nan et al., "Office X for Macintosh: The Missing Manual", O'Reilly Publishing, Jul. 2002.

U.S. Office Action dated Dec. 19, 2006 cited in U.S. Appl. No. 10/954,328.

U.S. Final Office Action dated Jun. 11, 2007 cited in U.S. Appl. No. 10/954,328.

U.S. Office Action dated Nov. 1, 2007 cited in U.S. Appl. No. 10/954,328.

European Communication dated Aug. 23, 2007, European Search Report for Application No. EP05105348.6-1243.

Anonymous: "Newest Release of Verity Key View Viewing Software Development Kits Now Available", Verity Press Release, Sep. 27, 2004, XP-002447751, http://www.autonomy.com/content/News/Releases/2004/V0927.en.html.

Anonymous: "Verity KeyView Viewing SDK Guide—Version 8.0", Verity KeyView Documentation, No. DE0156, dated May 28, 2004, XP007902819.

Anonymous: "Netscape Gecko Plug-ins—API Reference—Version 2.0", Netscape Documentation, Aug. 2002, XP007902820, http://devedge-temp.mozilla.org/library/manuals/2002/plugin/1.0/plugin.pdf.

Correspondence from the Japanese Patent Office regarding Japanese Patent Application No. 2005-183578 dated Mar. 7, 2008.

Correspondence from the Japanese Patent Office regarding Japanese Patent Application No. 2005-183578 dated Dec. 9, 2008.

Koyama, Takahiro, "Thorough Comparison, E-mail Software Best-of-ten Competition," Windows 2000 World, vol. 8, No. 2, pp. 199-211, IDG Japan, Inc., Japan, Feb. 1, 2003.

Hiraki, A. Itaru, "Integrated Sofware for Mobile Computing: Mobilesiute," Fujitsu, vol. 50, No. 5, pp. 334-337, Fujitsu Limited, Japan, Sep. 10, 1999.

Esposito, D., "More Windows 2000 UI Goodies: Extending Explorer Views by Customizing Hypertext Template Files", MSDN Magazine, Jun. 2000.

Office Action from the Korean Patent Office regarding Korean Patent Application No. 2005-0056790 dated Jul. 14, 2011, 4 pages.

Office Action from the United States Patent Office regarding U.S. Appl. No. 11/473,435 dated May 27, 2011.

Office Action from the Japan Patent Office regarding Japanese Patent Application No. 2005-275755 dated Apr. 8, 2011, 2 pages.

Kengo Inoue, "Supporting the start of new life, third, email/basic of BASIC," JUST MOAI, No. 132, p. 21, JustSystems Corporation, Japan, May 15, 2000, 7 pages.

Munechika Nishida, "Speedy mail software whose cooperation with the mobile phone or WorkPad is attractive, Shuriken Pro JustSystems," ASAHI Personal Computer, No. 264, pp. 100 and 101, The Asahi Shimbun Company, Japan, Apr. 15, 2000, 4 pages.

Office Action from the United States Patent Office regarding U.S. Appl. No. 10/954,328 dated Jan. 7, 2010.

Office Action from the United States Patent Office regarding U.S. Appl. No. 10/954,328 dated Dec. 23, 2008.

Office Action from the United States Patent Office regarding U.S. Appl. No. 10/954,328 dated May 22, 2008.

Office Action from the Mexican Patent Office regarding Application No. PA/a/2005/007080 dated May 29, 2008.

Office Action from the Patent Office of the Russian Federation regarding Application No. 2005120370 dated Jul. 10, 2009.

Office Action from the Patent Office of the Russian Federation regarding Application No. 2005130357 dated Aug. 6, 2009.

Office Action from the Patent Office of the Russian Federation regarding Application No. 2005120362 dated Jul. 7, 2009.

Office Action from the Japan Patent Office regarding Japanese Patent Application No. 2005-0183574 dated Jan. 14, 2011.

Office Action from the United States Patent Office regarding U.S. Appl. No. 11/473,435 dated Aug. 21, 2008.

Office Action from the United States Patent Office regarding U.S. Appl. No. 11/473,435 dated Mar. 24, 2009.

Office Action from the United States Patent Office regarding U.S. Appl. No. 11/473,435 dated Sep. 17, 2009.

Office Action from the United States Patent Office regarding U.S. Appl. No. 11/473,435 dated May 14, 2010.

Office Action from the European Patent Office regarding Application No. 05105348.6 dated Apr. 25, 2008.

Office Action from the Patent Office of the State Intellectual Property Office of the People's Republic of China regarding Application No. 200510089509.9 dated May 9, 2008.

Office Action from the Australian Patent Office regarding Application No. 2005202723 dated Aug. 11, 2010.

Office Action from the Patent Office of the State Intellectual Property Office of the People's Republic of China regarding Application No. 200510099654.5 dated Feb. 12, 2010.

Office Action from the Patent Office of the State Intellectual Property Office of the People's Republic of China regarding Application No. 200510099654.5 dated Jul. 29, 2010.

Office Action from the Australian Patent Office regarding Application No. 2005203710 dated Aug. 12, 2009.

Office Action from the Australian Patent Office regarding Application No. 2005203710 dated Dec. 18, 2009.

Office Action from the European Patent Office regarding Application No. 05105464.1 dated Apr. 12, 2007.

Office Action from the Patent Office of the State Intellectual Property Office of the People's Republic of China regarding Application No. 200510088513.3 dated May 9, 2008.

Office Action from the Australian Patent Office regarding Application No. 2005202716 dated Aug. 12, 2009.

Office Action from the Australian Patent Office regarding Application No. 2005202716 dated Dec. 18, 2009.

European Patent Office Communication regarding Application No. 05 105 348.6 dated Jan. 5, 2010, 37 pages.

Hobona et al., "Enhancing Data Discovery Using the ArcSDE Java API", ESRI International User Conference Aug. 2004, available at http://gis.esri.com/library/userconf/proc04/docs/pap1840.pdf.

Taylor, Owen, "A new file selector for GTK+", Feb. 2003, available at http://people.redhat.com/otaylor/fosdem2003/file-selector.html#introduction.

Sonnino et al., "FileSnoop 2: Safe & Efficient Windows Exploring", PCMAG.COM, Apr. 20, 2004, available at http://www.pcmag.com/article2/0,1895,1571719,00.asp?kc=PCGL10310KTX2B2200331.

Office Action from the Japan Patent Office regarding Japanese Patent Application No. 2005-0183574 dated Aug. 12, 2011.

Office Action from the Korean Patent Office regarding Korean Patent Application No. 10-2005-0057765 dated Aug. 24, 2011.

* cited by examiner

METHOD AND COMPUTER-READABLE MEDIUM FOR NAVIGATING BETWEEN ATTACHMENTS TO ELECTRONIC MAIL MESSAGES

CROSS-REFERENCE TO RELATED APPLICATIONS

This patent application is a continuation of U.S. patent application Ser. No. 10/993,950 titled "Method and Computer-Readable Medium for Navigating Between Attachments to Electronic Mail Messages" which was filed on Nov. 19, 2004 and which issued as U.S. Pat. No. 7,647,559 on Jan. 12, 2010 and which is a continuation-in-part of U.S. patent application Ser. No. 10/955,361 titled "Method and Computer-Readable Medium for Previewing and Performing Actions on Attachments to Electronic Mail Messages" which was filed on Sep. 30, 2004 and which issued as U.S. Pat. No. 7,243,298 on Jul. 10, 2007. These applications are expressly incorporated herein by reference. This patent application is also related to U.S. patent application Ser. No. 10/954,328 titled "Method, System, and Apparatus for Providing A Document Preview" which was filed on Sep. 30, 2004 and which is also expressly incorporated herein by reference.

BACKGROUND OF THE INVENTION

Users of electronic mail ("e-mail") client application programs are commonly frustrated by the number of steps that must be taken by a user to view the contents of a document that has been attached to an e-mail message. In many cases, a user only wants to see a preview of the attachment. A preview is a read-only rendering of a document that mimics what a user would have seen if the document was opened with an application program associated with the document. However, in the typical case, the user is required to select the attachment and then launch the application program associated with the attachment to view its contents.

When this traditional process for viewing the contents of an e-mail attachment is performed, the user is required to change application contexts between the e-mail client application and the application utilized to view the attachment. When the user has finished viewing the attachment, the user must again switch application contexts by closing the application program and returning to the e-mail client application. Switching application contexts in this manner to view a preview of an e-mail attachment can be both time consuming and frustrating for a user.

Because prior application programs have not provided a mechanism for allowing users to view the contents of an e-mail attachment without switching application contexts, these application programs have also not provided a convenient mechanism to navigate among the attachments to an e-mail message. In particular, these application programs have not provided a user interface mechanism through which a user can easily view the available attachments to an e-mail message and select one of the attachments for previewing.

It is with respect to these considerations and others that the various embodiments of the present invention have been made.

BRIEF SUMMARY OF THE INVENTION

In accordance with the embodiments of the present invention, the above and other problems are solved by a method and computer-readable medium for navigating between attachments to electronic mail messages. The various embodiments of the invention allow a user to quickly identify and select an attachment to an electronic mail message from any number of attachments. The embodiments of the invention also allow a user to quickly preview the contents of e-mail attachments without switching application contexts.

According to one embodiment of the invention, a method is provided for navigating between attachments to e-mail messages. According to the method, a list of e-mail messages is displayed that includes header information associated with each of the messages. For instance, the list may include header information that identifies a sender of each e-mail message, a subject for each e-mail message, and a received time for each e-mail message. Other information may also be displayed. When one of the messages in the list is selected, a determination is made as to whether the selected message has attachments. If the selected message has attachments, an identifier is displayed adjacent to the header information for each attachment. The identifier indicates that the attachment is associated with the selected message and may provide other information such as the type and size of the attachment. The identifiers are displayed in a manner to indicate clearly to a user that the attachments are associated with the selected e-mail message.

According to other embodiments of the invention, one of the identifiers corresponding to an attachment may be selected. In response to such a selection, the selected e-mail message is deselected and a preview is generated and displayed for the attachment corresponding to the selected identifier. If another identifier corresponding to another attachment is selected, a preview is then generated and displayed for that attachment. If another e-mail messages in the list is selected, identifiers for the first selected e-mail message are removed and any identifiers for the newly selected e-mail message are displayed.

According to another embodiment of the invention, a selection may be received of one of the e-mail messages in the list. A request may also be received to open the selected message for viewing. This may occur, for instance, through a double mouse click of an e-mail message in the list. In response to such a request, the selected e-mail message is opened for viewing and the contents of the selected mail message are displayed. A user interface is also displayed for navigating between attachments to the displayed e-mail message. The user interface includes an identifier for each of the attachments to the selected message and may be displayed adjacent to the display of the contents of the selected mail message.

According to other embodiments, a selection may be received of one of the identifiers within the user interface for navigating between attachments. In response to such a selection, a preview is generated for the attachment corresponding to the selected identifier and the preview is displayed. The preview may be displayed adjacent to the display of the contents of the selected mail message. In this manner, a user may easily view both the contents of the selected e-mail message and the preview of the selected attachment.

The invention may be implemented as a computer process, a computing system, or as an article of manufacture such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features, as well as advantages, which characterize the present invention, will be apparent from a reading of the following detailed description and a review of the associated drawings.

DETAILED DESCRIPTION OF THE INVENTION

Figure 1:
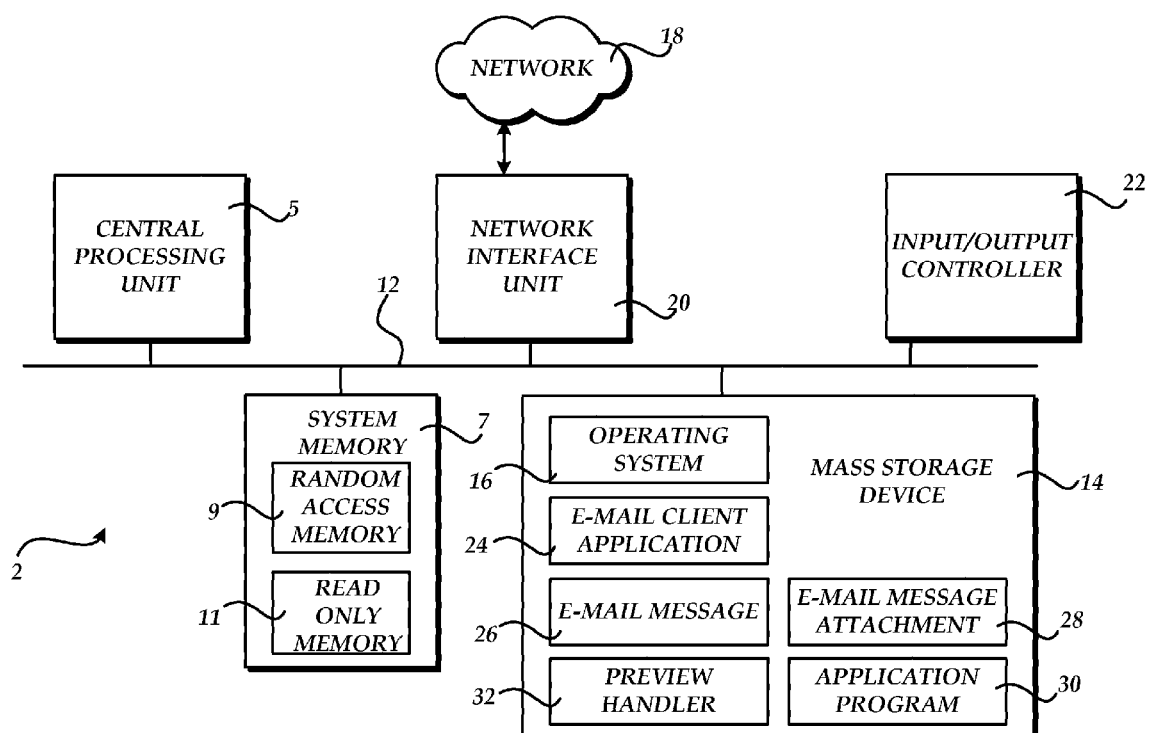
FIG. 1 is a computer system architecture diagram illustrating a computer system utilized in and provided by the various embodiments of the invention.

Referring now to the drawings, in which like numerals represent like elements, various aspects of the present invention will be described. In particular, FIG. 1 and the corresponding discussion are intended to provide a brief, general description of a suitable computing environment in which embodiments of the invention may be implemented. While the invention will be described in the general context of program modules that execute in conjunction with program modules that run on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring now to FIG. 1, an illustrative computer architecture for a computer 2 utilized in the various embodiments of the invention will be described. The computer architecture shown in FIG. 1 illustrates a conventional desktop or laptop computer, including a central processing unit 5 ("CPU"), a system memory 7, including a random access memory 9 ("RAM") and a read-only memory ("ROM") 11, and a system bus 12 that couples the memory to the CPU 5. A basic input/output system containing the basic routines that help to transfer information between elements within the computer, such as during startup, is stored in the ROM 11. The computer 2 further includes a mass storage device 14 for storing an operating system 16, application programs, and other program modules, which will be described in greater detail below.

The mass storage device 14 is connected to the CPU 5 through a mass storage controller (not shown) connected to the bus 12. The mass storage device 14 and its associated computer-readable media provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed by the computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 2.

According to various embodiments of the invention, the computer 2 may operate in a networked environment using logical connections to remote computers through a network 18, such as the Internet. The computer 2 may connect to the network 18 through a network interface unit 20 connected to the bus 12. It should be appreciated that the network interface unit 20 may also be utilized to connect to other types of networks and remote computer systems. The computer 2 may also include an input/output controller 22 for receiving and processing input from a number of other devices, including a keyboard, mouse, or electronic stylus (not shown in FIG. 1). Similarly, an input/output controller 22 may provide output to a display screen, a printer, or other type of output device.

As mentioned briefly above, a number of program modules and data files may be stored in the mass storage device 14 and RAM 9 of the computer 2, including an operating system 16 suitable for controlling the operation of a networked personal computer, such as the WINDOWS XP operating system from MICROSOFT CORPORATION of Redmond, Wash. The mass storage device 14 and RAM 9 may also store one or more program modules. In particular, the mass storage device 14 and RAM 9 may store an e-mail client application 24. The e-mail client application 24 is operative to send and receive e-mail messages 26 over the network 18. The e-mail messages sent or received may also include attachments 28. The attachments may comprises any file type, and commonly include pictures, word processing documents, compressed files, and other types of files.

As will be described in greater detail herein, the e-mail client application 24 is operative to provide a user interface for navigating between e-mail message attachments. The embodiments of the invention are also operative to display a preview of a document attached to an e-mail message without requiring a user to switch to another application program. Details regarding the user interface and a process for generating the interface are provided below with respect to FIGS. 2A-2C, 4, and 6. The e-mail client application 24 is also operative to identify one or more actions that may be performed on a document attached to an e-mail message. User interface objects for performing the actions may be displayed to a user as a part of the preview user interface.

One of the actions provided by the e-mail client application 24 comprises an action for quickly generating an e-mail message in reply to an e-mail message having an attachment. The reply e-mail message includes a changed version of the original attachment. In order to provide this functionality, the e-mail client application 24 may launch an application program 30 capable of editing the original attachment. The user may then be permitted to edit the attachment and quickly transmit the changed attachment as a reply to the original e-mail message. Additional details regarding an action for replying to an e-mail message with a changed attachment are provided below with respect to FIGS. 3 and 5.

According to embodiments of the invention, the e-mail client application 24 comprises the OUTLOOK personal information manager application program from MICROSOFT CORPORATION. It should be appreciated, however, that the invention may be utilized with other application programs capable of sending and receiving e-mail messages provided by other manufacturers. According to embodiments of the invention, the application 30 comprises a word processing application program, such as the WORD word processing application program from MICROSOFT CORPORATION. It should be appreciated, however, that other types of application programs and other word processing application programs from other manufacturers may be utilized to embody the various aspects of the present invention.

In order to generate the preview of an attachment to an e-mail message, the e-mail client application 24 utilizes the services of a preview handler 32. The preview handler 32 is responsible for locating and executing a previewer capable of generating a visual preview for the attachment. The previewer renders the preview into a window provided by the e-mail client application 24. In this manner, the preview appears to have been rendered by the e-mail client application program 24 even though it was rendered by a separate previewer. The operation of an illustrative preview handler is described in U.S. patent application Ser. No. 10/954,328 filed on Sep. 30, 2004 and entitled "Method, System, and Apparatus for Providing A Document Preview" which is expressly incorporated herein by reference.

Figure 2A:
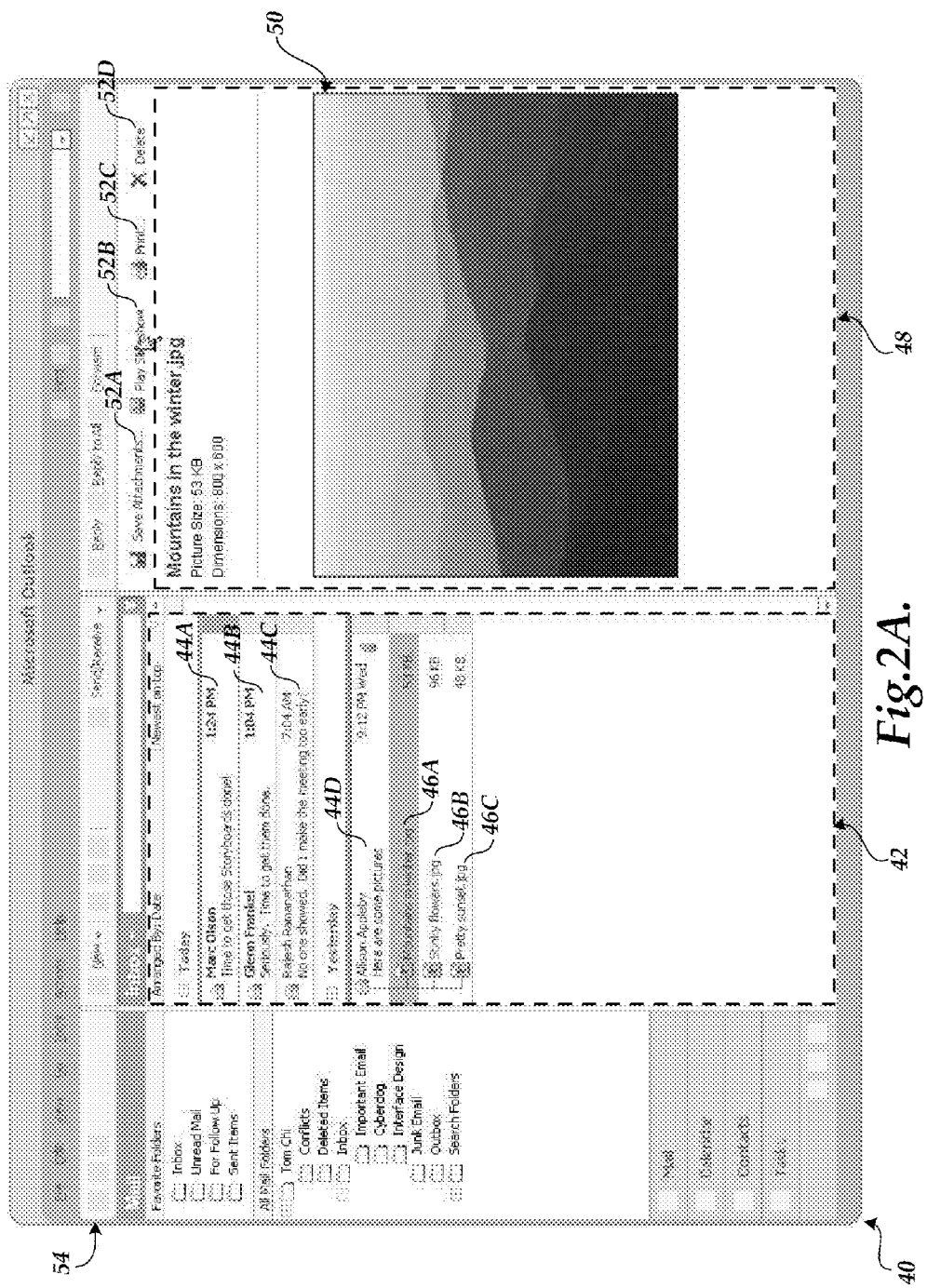
FIGS. 2A-2C and 3 are screen display diagrams illustrating several screen displays provided by the various embodiments of the invention.

Referring now to FIG. 2A, an illustrative user interface provided by the various embodiments of the invention will be described. In particular, FIG. 2A shows a screen display 40 generated by the e-mail client application 24. The screen display 40 comprises a user interface window having a list pane 42 in which one or more e-mail messages 44A-44D are identified. As shown in FIG. 2, the e-mail messages 44A-44D are identified by displaying a portion of the e-mail header information including the sender's name, the message subject, and the time the message was sent. It should be appreciated that other information may be displayed to identify the e-mail messages 44A-44D in the list pane 42.

As shown in FIG. 2A, the e-mail message 44D includes three attached documents 46A-46D. The attachments 46A-46C are indicated as being attachments to the e-mail message 44D by a line extending from the e-mail message 44D to each of the attachments. Moreover, the attachments 46A-46C are identified by an icon corresponding to the document type, by the name of the each attachment, and by an indication of the size of each attachment. The indicator for the attachments 46A-46C are also offset from the indicator for the e-mail message 44D to indicate the child/parent relationship. Other types of information may also be displayed for each attachment. A paperclip icon is also displayed in conjunction with the e-mail message 44D to indicate that attachments are present but any type of icon or visual indicator may be utilized.

It should be appreciated that, according to one embodiment of the invention, the indicators for each of the attachments 46A-46C are only displayed in response to the selection of the message 44D. When another message is selected, the indicators for the attachments 46A-46C are removed. If the newly selected message has attachments, then the identifiers for those attachments are displayed. If the newly selected message does not have attachments then no identifiers are displayed.

According to other aspects of the invention, a user may select one of the attachments 46A-46C utilizing an appropriate user input device. For instance, a single mouse click may be made upon the attachment 46A to select the attachment. In response to such a selection, a preview 50 will be generated of the attachment and displayed in the reading pane 48. The reading pane 48 is displayed adjacent to the list pane 42. The reading pane 48 may also include other information regarding the attachment 46A such as the name of the attachment and the size of the attachment. Information particular to a type of attachment may also be displayed such as the number of pixels in an attached picture. If the user selects another of the attachments 46A-46C, a preview for the selected attachment will be generated and displayed in the reading pane 48.

According to aspects of the invention, the e-mail client application 24 may also be operative to identify one or more actions that can be performed upon an attachment and to display the available actions in conjunction with the preview 50. For instance, as shown in FIG. 2A, a number of actions 52A-52D have been identified for the attachment 46A. In particular, the action 52A allows the attachment to be saved to the mass storage device 14, the action 52B causes a slide show to be generated and displayed for the attachments 46A-46C, the action 52C causes the previewed attachment 46A to be printed, and the action 52D causes the attachment 52D to be deleted.

It should be appreciated that many different types of actions may be identified for each file type. For instance, a slide show action may be made available for pictures and presentation documents, actions may be made available for accepting or declining attached meeting requests, attached contact files may be added to a contacts list in a personal information manager, playback controls may be displayed for audio files, and actions may be provided for displaying attached facsimile documents. Other actions may also be displayed that are appropriate for all file types, such as opening, saving, deleting, and printing. In one embodiment, only the actions specific to a particular file type are displayed adjacent to the preview 50. Other actions common to all file types may be displayed in a tool bar 54. When multiple attachments are selected, the header and the preview shown may be for the first attachment. Only the actions that are available for all of the selected attachments will be displayed in proximity to the preview 50.

Figure 2B:
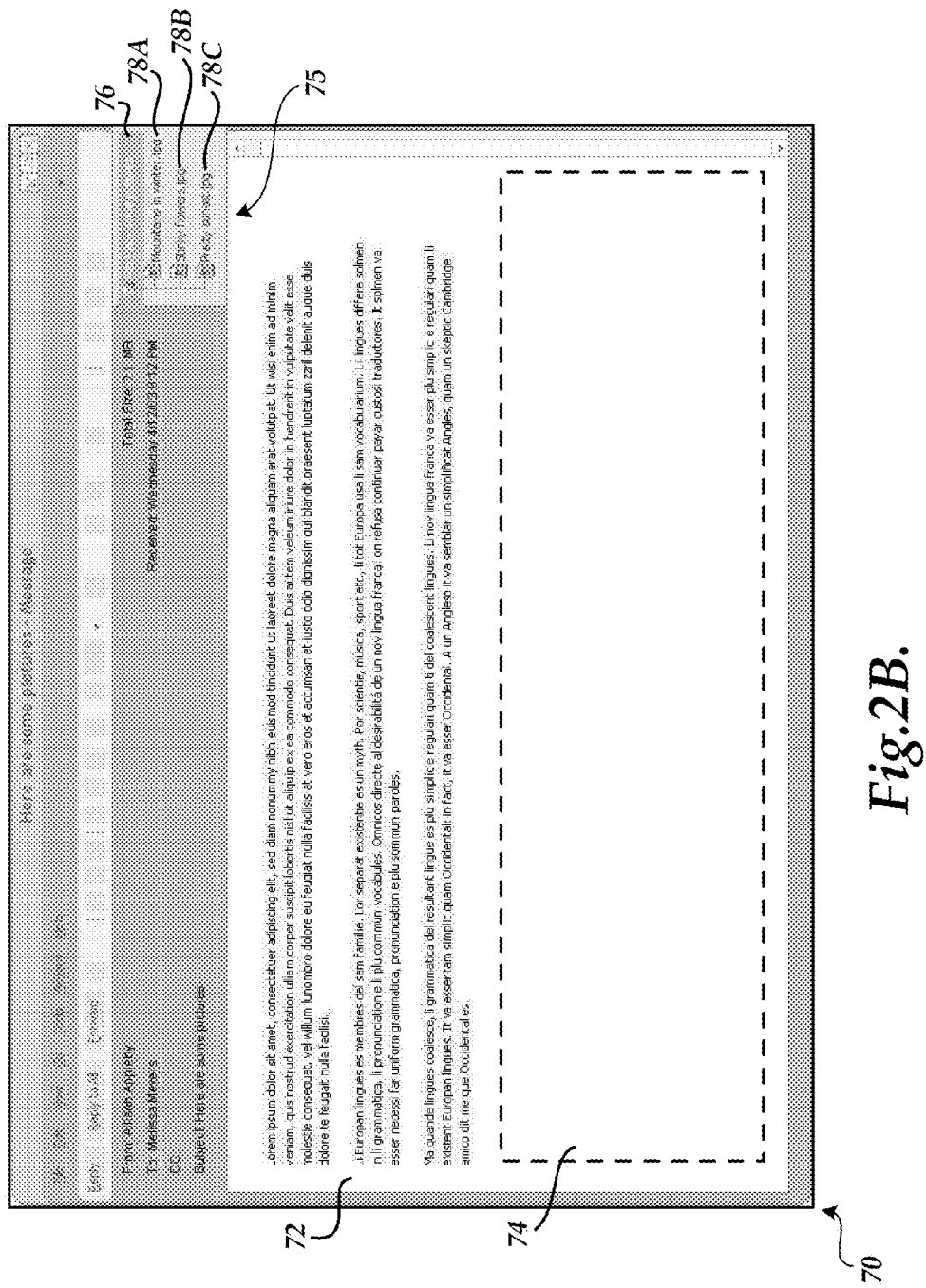

According to other aspects of the invention, a user may provide a request to open one of the e-mail messages 44A-44D for viewing. For instance, a user may utilize a mouse input device to "double click" one of the messages 44A-44D. In response to such a request, a screen display 70 such as that shown in FIG. 2B may be displayed. As shown in FIG. 2B, the screen display 70 includes a body area 72 where the contents of the selected e-mail message are displayed. The screen display 70 also includes a user interface 75 for navigating between the attachments to the selected e-mail message.

The user interface 75 includes an identifier 76 for the selected e-mail message and one or more identifiers 78A-78C for each of the attachments to the selected e-mail message. In an embodiment, the identifiers 78A-78C include an icon that identifies the type of the attachment and the name of the attachment. Other types of information may also be provided. As shown in FIG. 2B, the identifiers 76 and 78A-78C are displayed in a manner to clearly indicate that the attachments are associated with the selected e-mail message. In particular, a line is displayed to indicate the hierarchical relationship between the selected message and its attachments. Other types of user interfaces may be provided to illustrate this relationship to the user.

According to one embodiment of the invention, the indicators 76 and 78A-78C may be selected by a user. If the indicator 76 is selected, the contents of the e-mail message are displayed in the body area 72. If one of the indicators 78A-78C are selected, a preview is generated for the attachment corresponding to the selected indicator and the preview is displayed in the body area 72. According to another embodiment, the contents of the selected e-mail message may be continually displayed and the preview for a selected attachment may be simultaneously displayed in a separate preview areas 74. In this manner, both the body of the selected e-mail message and a preview of a selected attachment may be viewed simultaneously.

Figure 2C:
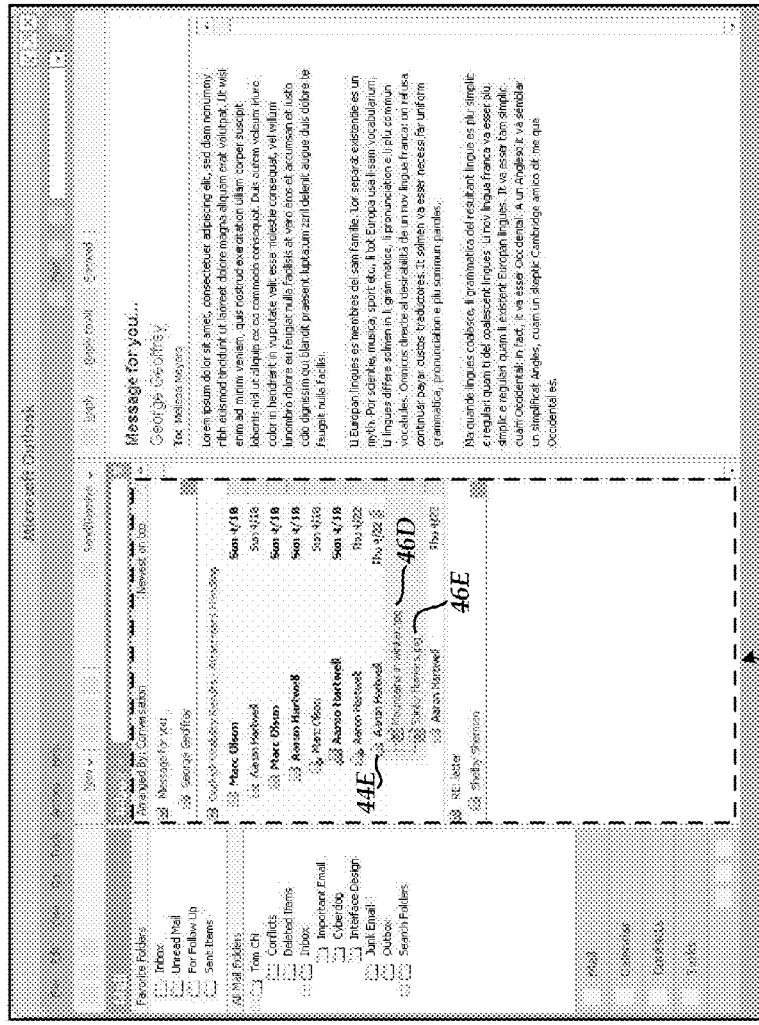

Referring now to FIG. 2C, additional aspects of the various embodiments of the invention will be described. As shown in FIG. 2C, the messages identified in the list pane 42 may be displayed in a conversation view. The conversation view sorts the messages according to their sent and received order and indents each of the messages. In the conversation view, the indicators 46D and 46E for attachments to a particular e-mail message 44E may be displayed in the manner described above. In particular, the identifiers 46D and 46E may include an icon indicating the type of attachment and the name of the attachment. Moreover, the hierarchy between one of the messages 44E in the conversation view and its attachments may be indicated through the display of a line between the message 44E and the identifiers 46D and 46E without interfering with the conversation view.

Figure 3:
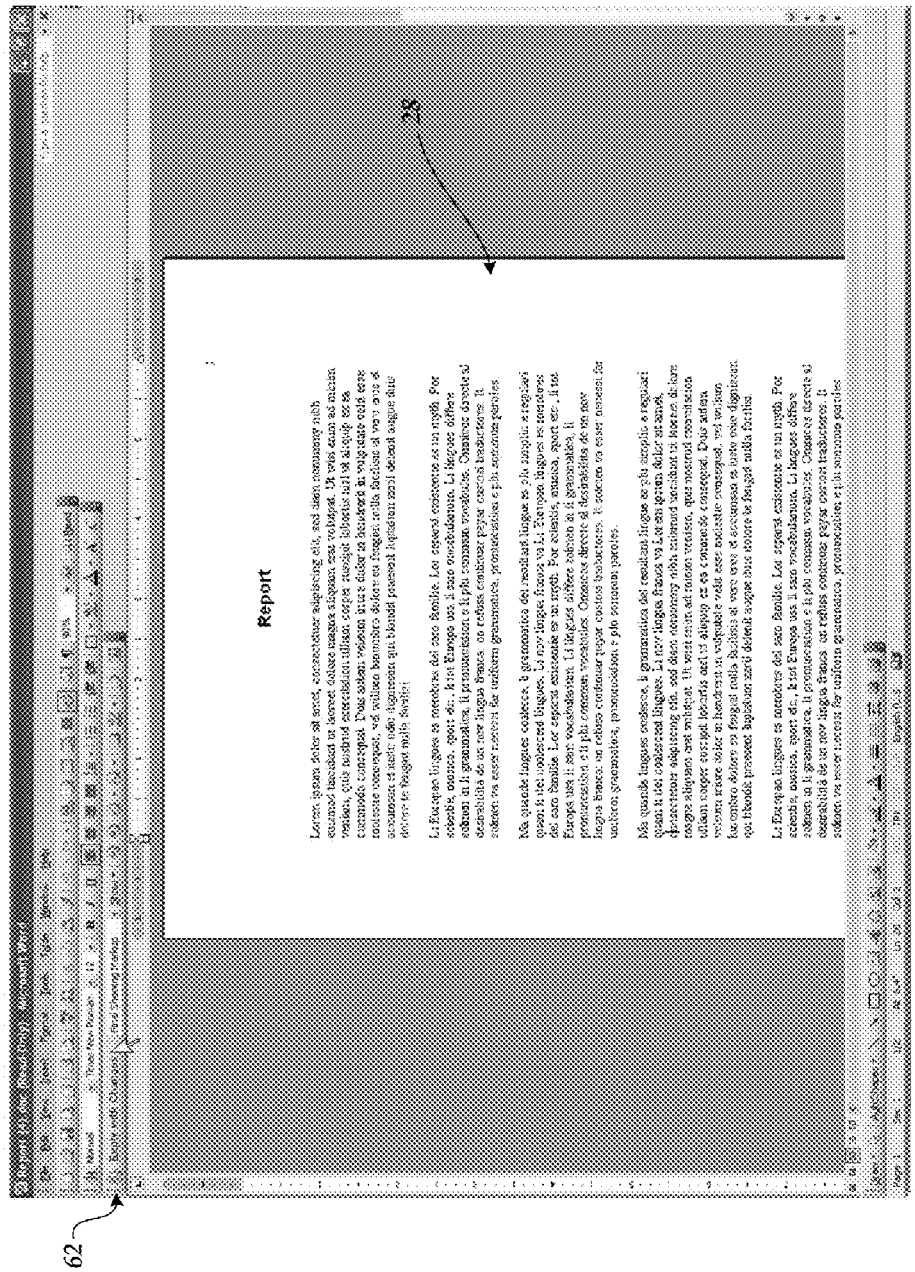

Referring now to FIG. 3, another illustrative user interface provided by the various embodiments of the invention will be described. In particular, FIG. 3 shows a screen display 60 generated by a word processing application utilized in conjunction with the various embodiments of the present invention. As described above, according to embodiments of the invention, an action may be provided for certain types of attached documents that allows a user to quickly edit the attachment and transmit a reply e-mail that includes the changed document as an attachment. In response to the selection of such an action, the word processing application program is launched for editing with the attached document. The screen display 60 shown in FIG. 3 illustrates the screen display shown by the word processing application once it has been launched in this manner.

As shown in FIG. 3, the word processing application program provides the conventional tools for editing the document 28. "Reply with changes" button 62 is also displayed in conjunction with the user interface for editing the document 28. Selection of the button 62 causes a reply message to be generated with the e-mail fields populated and the document 28 attached. The user may then edit the contents of the reply message and send the message. By integrating the e-mail client application 24 and the word processing application in this manner, a user is freed from the tedious process for editing documents attached to e-mail messages required by previous e-mail client applications.

It should be appreciated that although the embodiment of the invention described herein is presented in the context of a word processing application program, other types of applications program may also be used similarly. For instance, if an e-mail message includes a presentation document as an attachment, a presentation program may be launched in response to a request to transmit a reply message including a modified attachment. Any other type of document may be edited and transmitted in a similar manner.

Figure 4:
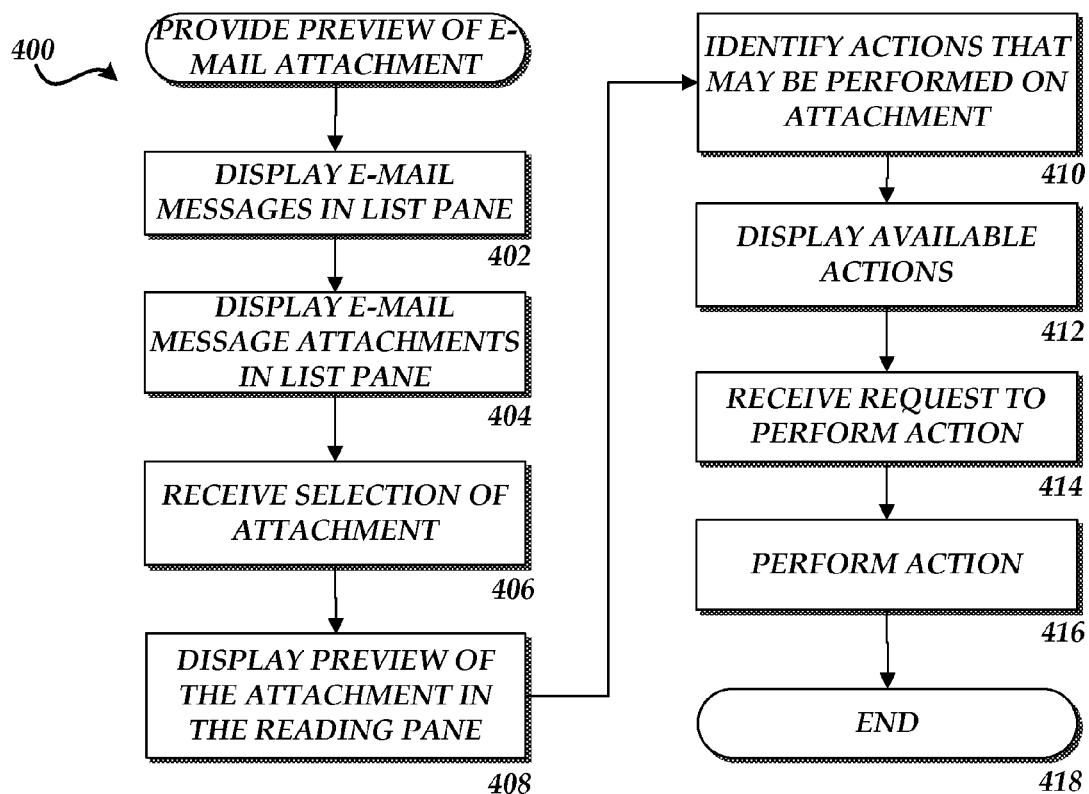
FIGS. 4-6 are flow diagrams illustrating various processes provided by the several embodiments of the invention.

Referring now to FIG. 4, an illustrative routine 400 will be described illustrating a process performed by the e-mail client application 24 for previewing and performing actions on attachments to e-mail messages. It should be appreciated that although the embodiments of the invention described herein are presented in the context of an e-mail client application program 24, the invention may be utilized in other types of application programs.

When reading the discussion of the routines presented herein, it should be appreciated that the logical operations of various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated in FIGS. 4-5, and making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims set forth herein.

The routine 400 begins at operation 402, where the e-mail client application 24 displays e-mail messages in the list pane 42. The routine 400 then continues to operation 404, where the documents attached to the e-mail messages shown in the list pane are also displayed. The attachments may be displayed in the manner described above with respect to FIG. 2. From operation 404, the routine 400 continues to operation 406.

At operation 406, the e-mail client application 24 receives the user selection of an attachment to an e-mail message. In response to the selection, the e-mail client application 24 instructs the preview handler 32 to identify a previewer for the attachment and to generate a preview of the attachment. The generated preview is then displayed by the e-mail client application 24 in the reading pane 48 at operation 408. From operation 408, the routine 400 continues to operation 410.

At operation 410, the e-mail client application 24 identifies the actions that may be performed on the attachment. User interface objects, such as buttons, are then displayed for the identified actions adjacent to the preview 50. This occurs at operation 412. From operation 412, the routine 400 continues to operation 414, where a request is received from the user to perform one of the displayed actions. The request may be made, for instance, through a selection of one of the displayed user interface objects. The routine 400 then continues to operation 416, where the requested operation is performed. From operation 416, the routine 400 continues to operation 418, where it ends.

Figure 5:
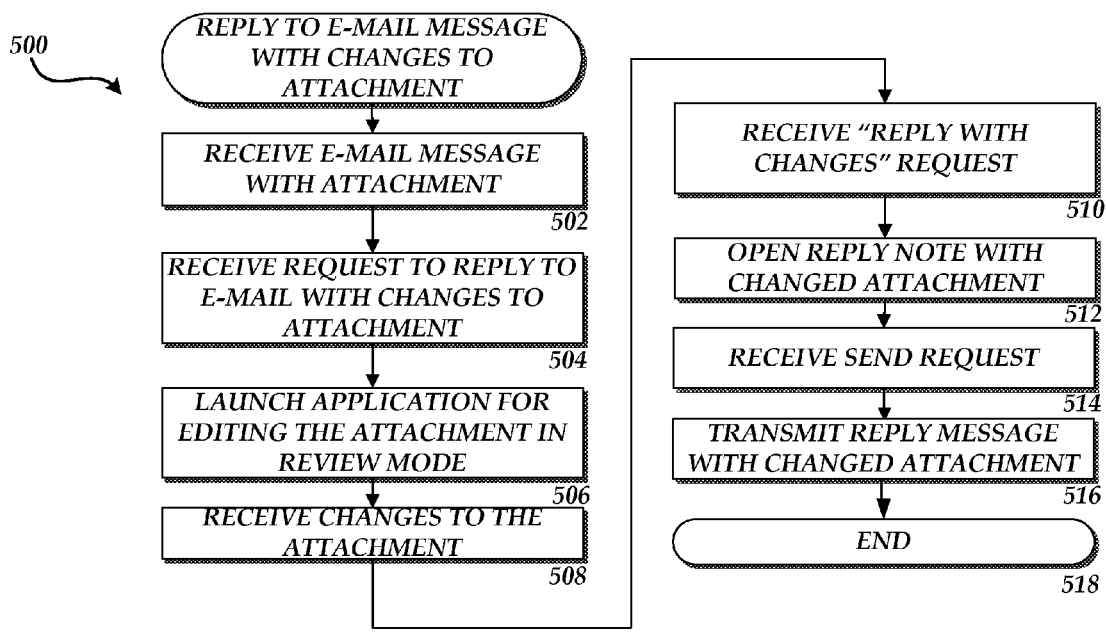

Turning now to FIG. 5, an illustrative routine 500 will be described for performing an action for replying to an e-mail message with changes to an attached document. The routine 500 begins at operation 502, where an e-mail message having an attachment is received by the e-mail client application 24. From operation 502, the routine 500 continues to operation 504, where a request is receive to reply to the original e-mail with changes to the attached document. This request may be made, for instance, through a user selection of one of the actions associated with a preview. From operation 504, the routine 500 continues to operation 506.

At operation 506, the e-mail client application 24 launches an application program associated with the attachment. For instance, if the attachment comprises a word processing document, the e-mail client application 24 may launch a word processing application for editing the document. The application program may also be launched in a state specifically designated for reviewing and modifying documents. Such a state is commonly referred to as a "review" mode and provides functionality for making document modifications in a manner that allows the modifications to be easily identified and read by another user.

As described briefly above, the application program may also be launched in a manner to cause the "reply with changes" button 62 to be displayed in conjunction with the editing screen. This occurs at operation 506 and allows a user to easily and quickly transmit the changed document as a reply to the original e-mail message. From operation 508, the routine 500 continues to operation 508, where changes to the attached document are received from the user. The routine 500 then continues to operation 510, where a request is received from the user to transmit the reply e-mail message including the changed document through the selection of the button 62.

In response to receiving the request to transmit the reply e-mail including the changed document, the routine 500 continues to operation 512 where a reply message is created with the changed document attached. The user can then add comments. If the user indicates the message should be sent, the routine continues to operation 516, where the e-mail client application transmits the reply e-mail with the changed document attached. The application program is closed and the user is returned to the display provided by the e-mail client application 24. The user may then preview other documents and interact with the e-mail client application 24 in the manner described herein. From operation 514, the routine 500 continues to operation 518, where it ends.

Figure 6:
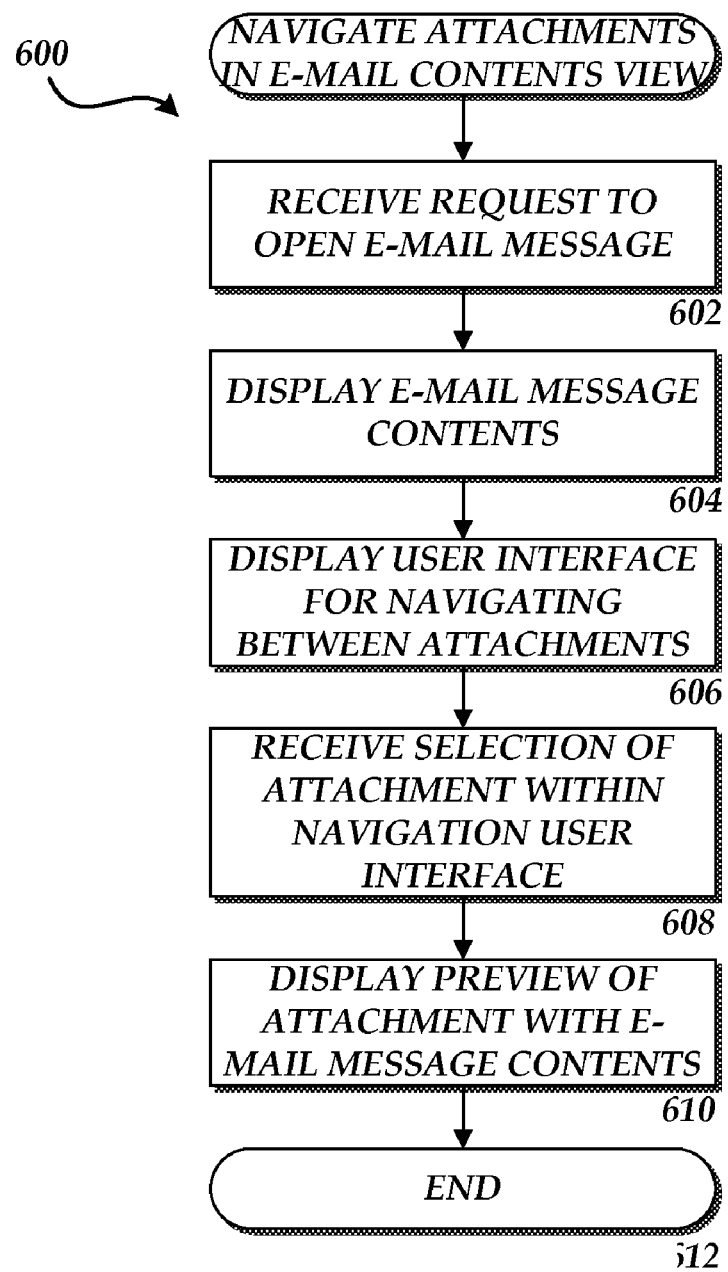

Referring now to FIG. 6, an illustrative routine 600 will be described for navigating between attachments to an e-mail message in a view which shows the contents of the e-mail message, such as that described above with respect to FIG. 2B. The routine 600 begins a operation 602, where a request is received from a user to open the contents of an e-mail message for viewing. In particular, such a request may comprises a double mouse click on an e-mail message or an equivalent keystroke. From operation 602, the routine 600 continues to operation 604.

At operation 604, a screen display similar to that shown in FIG. 2B may be displayed for the selected message. As described above, the screen display includes the display of the contents of the selected e-mail message. From operation 604, the routine 600 continues to operation 606, where the user interface 75 for navigating among attachments to the opened e-mail message is displayed. If a user selects an identifier for an attachment within the user interface 75 at operation 608, a preview is generated for the corresponding attachment. The preview is then displayed at operation 610. It should be appreciated that any of the attachments to an e-mail message may be previewed in this manner. Once the user has completed viewing the contents of the e-mail message and previews of the attachments, the user may close the screen display to return to the screen display shown in FIG. 2A. Accordingly, the routine 600 ends at operation 612.

Based on the foregoing, it should be appreciated that the various embodiments of the invention include a method, system, apparatus, and computer-readable medium for navigating and previewing attachments to electronic mail messages. The above specification, examples and data provide a complete description of the manufacture and use of the composition of the invention. Since many embodiments of the invention can be made without departing from the spirit and scope of the invention, the invention resides in the claims hereinafter appended.

We claim:

1. A method for navigating between one or more attachments to one or more electronic mail messages, the method comprising:
    displaying a user interface for an electronic mail application on a computing device, the user interface for the electronic mail application having a list pane for navigating among and selecting electronic mail messages and a reading pane for displaying previews of the electronic mail messages and attachments to the electronic mail messages;
    displaying a conversation view of the electronic mail messages in the list pane, the conversation view in the list pane representing the electronic mail messages as email conversations;
    in response to selection of an email conversation in the list pane, displaying sender identifiers of electronic mail messages associated with the selected email conversation, the sender identifiers displayed in the list pane at an indentation level indicating association of the electronic mail messages with the selected email conversation;
    receiving a selection of a sender identifier of an electronic mail message associated with the selected email conversation, the electronic mail message associated with the selected email conversation having an attachment;
    displaying a preview of the electronic mail message associated with the selected email conversation in the reading pane; and
    displaying a selectable identifier in the list pane for the attachment of the electronic mail message associated with the selected email conversation, the selectable identifier in the list pane for the attachment configured to display a preview of the attachment in the reading pane that replaces the preview of the electronic mail message associated with the selected email conversation without switching context of the electronic mail application.

2. The method of claim 1, further comprising:
    receiving a selection of the selectable identifier in the list pane for the attachment of the electronic mail message associated with the selected email conversation; and
    displaying a preview of the attachment in the reading pane that replaces the preview of the electronic mail message associated with the selected email conversation.

3. The method of claim 2, further comprising:
    receiving a selection of a second selectable identifier in the list pane for a second attachment of the electronic mail message associated with the selected email conversation; and
    displaying a preview of the second attachment in the reading pane.

4. The method of claim 3, wherein the preview of the second attachment in the reading pane replaces a previously displayed preview.

5. The method of claim 2, further comprising:
    receiving a selection of a different electronic mail message associated with the selected email conversation; and
    displaying a preview of the different electronic mail message associated with the selected email conversation in the reading pane that replaces the preview of the attachment.

6. The method of claim 5, further comprising:
    removing previously displayed selectable identifiers from the list pane in response to the selection of the different electronic mail message associated with the selected email conversation.

7. The method of claim 1, further comprising:
receiving a request to open the electronic mail message associated with the selected email conversation;
displaying contents of the electronic mail message associated with the selected email conversation for viewing as an opened electronic mail message; and displaying a different selectable identifier for the attachment in the opened electronic mail message, the different selectable identifier for the attachment configured to display a preview of the attachment that replaces the contents of the electronic mail message associated with the selected email conversation in the opened electronic mail message.

8. The method of claim 7, further comprising:
receiving a selection of the different selectable identifier for the attachment displayed in the opened electronic mail message; and
displaying a preview of the attachment in the opened electronic mail message that replaces the contents of the electronic mail message associated with the selected email conversation.

9. The method of claim 1, further comprising:
displaying a different selectable identifier for the attachment in the reading pane while the preview of the electronic mail message associated with the selected email conversation is displayed in the reading pane; and
in response to selection of the different selectable identifier for the attachment displayed in the reading pane, displaying a preview of the attachment in the reading pane that replaces the preview of the electronic mail message associated with the selected email conversation.

10. A computer-readable storage medium having computer-executable instructions stored thereon which, when executed by a computer, will cause the computer to:
display a user interface for an electronic mail application on a computing device, the user interface for the electronic mail application having a list pane for navigating among and selecting electronic mail messages and a reading pane for displaying previews of the electronic mail messages and attachments to the electronic mail messages;
display a conversation view of the electronic mail messages in the list pane, the conversation view in the list pane representing the electronic mail messages as email conversations;
in response to selection of an email conversation in the list pane, display sender identifiers of electronic mail messages associated with the selected email conversation, the sender identifiers displayed in the list pane at an indentation level indicating association of the electronic mail messages with the selected email conversation;
receive a selection of a sender identifier of an electronic mail message associated with the selected email conversation, the electronic mail message associated with the selected email conversation having an attachment;
display a preview of the electronic mail message associated with the selected email conversation in the reading pane; and
display a selectable identifier in the list pane for the attachment of the electronic mail message associated with the selected email conversation, the selectable identifier in the list pane for the attachment configured to display a preview of the attachment in the reading pane that replaces the preview of the electronic mail message associated with the selected email conversation without switching context of the electronic mail application.

11. The computer-readable storage medium of claim 10, having further computer-executable instructions stored thereon which, when executed by the computer, will cause the computer to:
receive a selection of the selectable identifier in the list pane for the attachment of the electronic mail message associated with the selected email conversation; and
display a preview of the attachment in the reading pane that replaces the preview of the electronic mail message associated with the selected email conversation.

12. The computer-readable storage medium of claim 11, having further computer-executable instructions stored thereon which, when executed by the computer, will cause the computer to:
receive a selection of a second selectable identifier in the list pane for a second attachment of the electronic mail message associated with the selected email conversation; and
display a preview of the second attachment in the reading pane.

13. The computer-readable storage medium of claim 12, wherein the preview of the second attachment in the reading pane replaces a previously displayed preview.

14. The computer-readable storage medium of claim 11, having further computer-executable instructions stored thereon which, when executed by a computer, will cause the computer to:
receive a selection of a different electronic mail message associated with the selected email conversation; and
display a preview of the different electronic mail message associated with the selected email conversation in the reading pane that replaces the preview of the attachment.

15. The computer-readable storage medium of claim 14, having further computer-executable instructions stored thereon which, when executed by a computer, will cause the computer to:
remove previously displayed selectable identifiers from the list pane in response to the selection of the different electronic mail message associated with the selected email conversation.

16. The computer-readable storage medium of claim 10, having further computer-executable instructions stored thereon which, when executed by a computer, will cause the computer to:
receive a request to open the electronic mail message associated with the selected email conversation;
display contents of the electronic mail message associated with the selected email conversation for viewing as an opened electronic mail message; and display a different selectable identifier for the attachment in the opened electronic mail message, the different selectable identifier for the attachment configured to display a preview of the attachment that replaces the contents of the electronic mail message associated with the selected email conversation in the opened electronic mail message.

17. The computer-readable storage medium of claim 16, having further computer-executable instructions stored thereon which, when executed by a computer, will cause the computer to:
receive a selection of the different selectable identifier for the attachment displayed in the opened electronic mail message; and
display a preview of the attachment in the opened electronic mail message that replaces the contents of the electronic mail message associated with the selected email conversation.

18. The computer-readable storage medium of claim 17, having further computer-executable instructions stored thereon which, when executed by a computer, will cause the computer to:
- displaying a different selectable identifier for the attachment in the reading pane while the preview of the electronic mail message associated with the selected email conversation is displayed in the reading pane; and
- in response to selection of the different selectable identifier for the attachment displayed in the reading pane, display a preview of the attachment in the reading pane that replaces the preview of the electronic mail message associated with the selected email conversation.

19. A computer-readable storage medium having computer-executable instructions stored thereon which, when executed by a computer, will cause the computer to:
- display a user interface for an electronic mail application, the user interface comprising a list pane for navigating among and selecting electronic mail messages and a reading pane for displaying previews of the electronic mail messages and attachments to the electronic mail messages;
- display an email conversation in the list pane, the email conversation associated with multiple electronic mail messages;
- in response to selection of the email conversation in the list pane, display sender identifiers in the list pane for the multiple electronic mail messages of the email conversation, the sender identifiers for the multiple electronic mail messages displayed in the list pane at an indentation level indicating association of the multiple electronic mail messages with the email conversation; and
- in response to selection of an electronic mail message of the email conversation having multiple attachments, display selectable identifiers in the list pane for the multiple attachments of the electronic mail message of the email conversation, the selectable identifiers for the multiple attachments displayed in the list pane at an indentation level indicating association of the multiple attachments with the electronic mail message of the email conversation, the selectable identifiers for the multiple attachments configured to display previews of the multiple attachments of the electronic mail message of the email conversation in the reading pane without switching context of the electronic mail application.

20. The computer-readable storage medium of claim 19, having further computer-executable instructions stored thereon which, when executed by the computer, will cause the computer to:
- display a preview of the electronic mail message of the email conversation in the reading pane; and
- display different selectable identifiers for the multiple attachments in the reading pane which are configured to display previews of the multiple attachments of the electronic mail message of the email conversation in the reading pane.

\* \* \* \* \*